United States Patent [19]
Short et al.

[11] Patent Number: 5,452,988
[45] Date of Patent: Sep. 26, 1995

[54] BLADE PITCH CHANGE MECHANISM

[75] Inventors: Keith E. Short, Rockford; Bruce Krandel, Cherry Valley, both of Ill.

[73] Assignee: Sundstrand Corporation, Rockford, Ill.

[21] Appl. No.: 234,754

[22] Filed: Apr. 28, 1994

[51] Int. Cl.⁶ .................................................. B64C 11/32
[52] U.S. Cl. ......................... 416/151; 416/152; 416/153; 475/219; 475/279
[58] Field of Search ...................... 416/151, 152, 416/153, 165, 169 R; 475/219, 269, 271, 275, 279, 286, 290

[56] References Cited

U.S. PATENT DOCUMENTS

| | | | |
|---|---|---|---|
| 2,108,660 | 2/1938 | Farrell | 416/152 |
| 2,646,131 | 7/1953 | Mergen et al. | 416/151 |
| 2,738,045 | 3/1956 | Mergen et al. | 416/151 |
| 4,047,842 | 9/1977 | Avena et al. | 416/152 |
| 4,074,592 | 2/1978 | Stevens et al. | 475/219 |
| 5,282,719 | 2/1994 | McCarty et al. | 416/152 |

FOREIGN PATENT DOCUMENTS 546995  8/1942  United Kingdom .................. 416/152

*Primary Examiner*—Edward K. Look
*Assistant Examiner*—James A. Larson
*Attorney, Agent, or Firm*—Ryan M. Fountain

[57] ABSTRACT

A lightweight and compact apparatus is provided for altering and controlling the pitch of a plurality of rotating blades during rotation using a mechanical clutch and gear arrangement driven by a rotational speed differential between the blade drive shaft and the blades. A first set of clutches and gears controls the direction of rotational power to the pitch change mechanism and is disengaged from rotation when desired blade pitch is established. A second set of clutches and gears controls the speed of rotational power applied to the pitch change mechanism. This pitch change mechanism includes a failsafe capability against pitch change through disengagement of the directional clutches except when needed, and an inherent rotational lock resulting from the rate change clutches' bias to simultaneous engagement. Variation of that speed of rotational power permits coarse and fine pitch adjustments at variable rates.

10 Claims, 4 Drawing Sheets

BLADE PITCH CHANGE MECHANISM

FIELD OF THE INVENTION

The present invention relates to mechanisms for changing the pitch of a plurality of blades mounted on a rotating shaft of an engine. More particularly, the present invention relates to apparatus for changing the pitch of a plurality of fan blades of an aircraft gas turbine engine during aircraft operation on the ground and in flight.

BACKGROUND OF THE INVENTION

Pitch adjustment of the fan blades of a gas turbine engine may be used to optimize the efficient operation of the engine throughout its flight envelope or to provide reverse thrust on landing. Such adjustment can improve fuel economy and reduce engine noise, although precise and reliable pitch is important. Conventional pitch change mechanisms are derived from propeller installations where continual changes of pitch are required during flight. These mechanisms are mainly driven by hydraulic or electrical power supplied from a source external to the engine or generated locally to the pitch change mechanism.

Providing either hydraulic or electrical power from an external source results in extra lines through the engine and requires a means for transferring high hydraulic pressure or a large flow of electrical power from static to rotating parts. Generation of the required power locally to the pitch change mechanism on the rotating part of the engine also requires additional parts in the form of a hydraulic pump or electrical generator. All of this results in additional cost, weight and maintenance.

With a turbo-fan engine it may only be necessary to select a limited number of fan pitch settings, for example, at take-off, cruise and reverse thrust, requiring only intermittent operation of the mechanism for short periods of time in the flight cycle. Furthermore, with a turbo-fan it is sometimes necessary to inspect blades in situ and replace individual ones. This can be difficult due to the relative close positioning of the blades but the problem can be eased by varying the pitch setting. With conventional pitch change mechanisms this may require running the engine, making fan maintenance time consuming and expensive.

Accordingly, it is an object of the present invention to provide an improved method and apparatus for changing the pitch of rotating blades. Other objects include the provision of a pitch change apparatus for rotating blades which:
1. is light weight and reliable,
2. includes failsafe mechanisms in the event of power failure,
3. is durable and requires minimum maintenance,
4. can be operated with and/or without engine operation,
5. allows pitch coarse and fine adjustment at variable rates,
6. is inexpensive and of simplified construction, and
7. can be operated selectively and intermittently during engine operation.

SUMMARY OF THE INVENTION

A lightweight and compact apparatus is provided for altering and controlling the pitch of a plurality of rotating blades during rotation using a mechanical clutch and gear arrangement driven by a rotational speed differential between the blade drive shaft and the blades. A first set of clutches and gears is applied intermittently to control the direction of rotational power to the pitch change mechanism and is disengaged from rotation when desired blade pitch is established. A second set of clutches and gears controls the speed of rotational power applied to the pitch change mechanism. This pitch change mechanism includes failsafe capability against pitch change through disengagement of the directional clutches except when needed, and an inherent rotational lock resulting from the rate change clutches' bias to simultaneous engagement. Variation of that speed of rotational power permits coarse and fine pitch adjustments at variable rates.

According to the present invention, a pitch change mechanism is provided for a plurality of blades mounted in a first rotor for rotation about their longitudinal axes. A first drive shaft is provided for rotating the first rotor. There is further provided a second rotor and a second drive shaft for rotating the second rotor at a different speed to the first rotor, the ratio of the speeds of the first and second rotors being fixed. The pitch change mechanism comprises adjustment means to rotate the blades of the first rotor about their longitudinal axes. A gear box provides rotary power to the adjustment means in response to a control signal, the gear box being mounted to rotate with the first shaft, and a mechanical connection with the second shaft provides an input drive to the gear box. The gear box uses the difference between the speeds of the two shafts to drive an output shaft which provides rotary power to drive the adjustment means.

Preferably, the mechanical connection with the second shaft is a further shaft coupled to the second shaft so that the further shaft rotates with the second shaft to provide an input drive to the gear box. The further shaft may be coupled to the second shaft by at least one splined joint.

The gear box may include clutch means which selectively engages the output shaft in response to the control signal to provide intermittent operation of the pitch change mechanism. Preferably the gear box is further provided with means to rotate the output shaft in either direction. The clutches can be activated by various means. A preferred embodiment would utilize electromagnetic forces with no physical contact across rotating interfaces to simplify communication of common signals, to preclude wear, and to enhance reliability.

The adjustment means is preferably a plurality of levers, a lever being attached to each of the blades so that movement of the levers causes the blades to rotate about their longitudinal axes. The levers may be attached to a carriage mounted on a ballscrew having a recirculating ball thread, translation of the carriage along the ballscrew moving the levers so as to rotate the blades about their longitudinal axes.

The control signal may be an electrical signal which is generated automatically by an engine electronic control system.

In the preferred embodiment of the present invention the pitch change mechanism is for use with fan blades of an aircraft gas turbine engine. Preferably the gear box is mounted in the fan shaft and the fan shaft is driven by a turbine shaft through a reduction gear box.

Other objects advantages and novel features of the present invention will now become readily apparent to those of skill in the art from the following drawings and detailed description.

DESCRIPTION OF PREFERRED EMBODIMENTS

Figure 1:
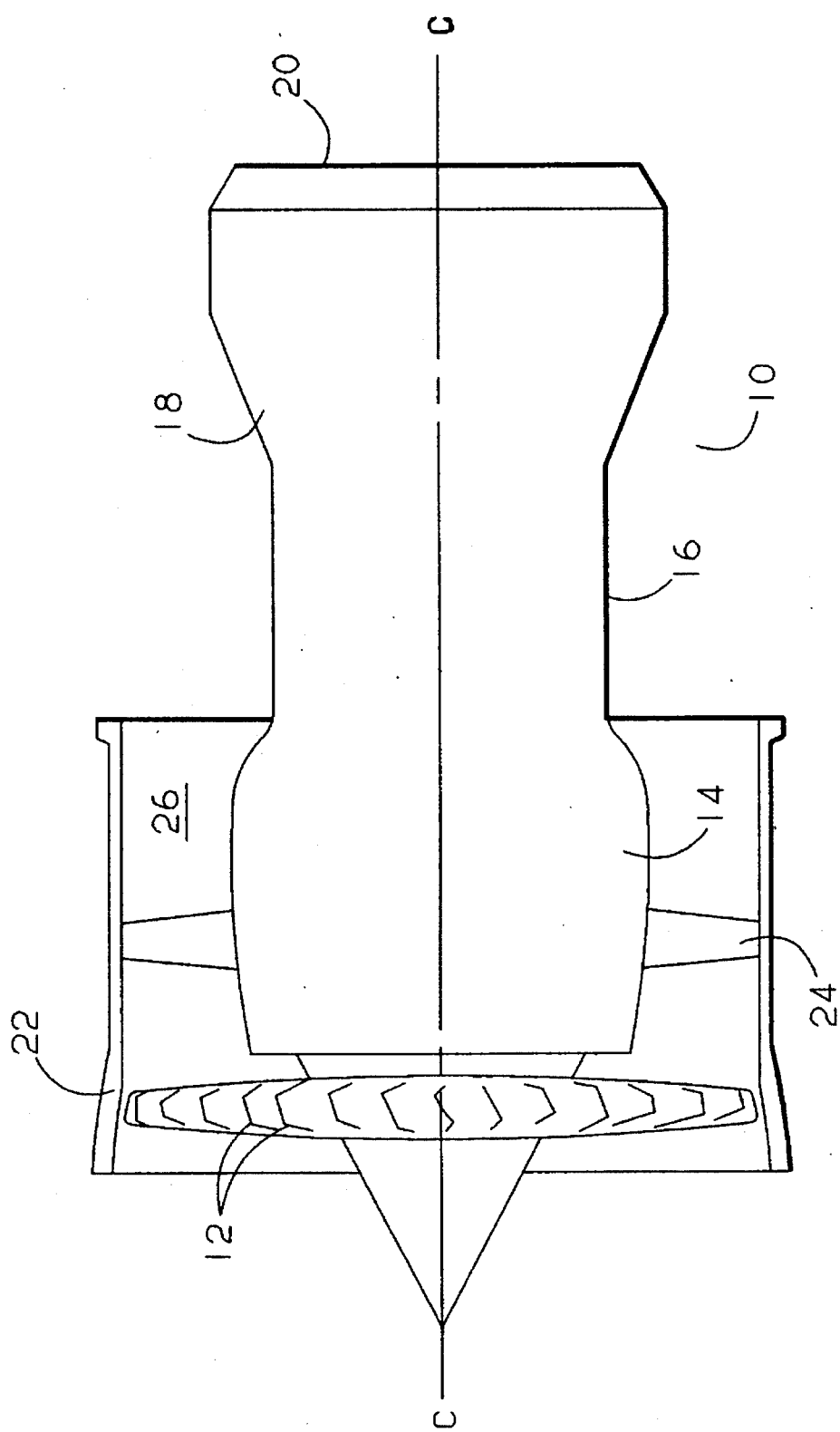
FIG. 1 is a diagrammatic view of a gas turbine engine having a pitch change mechanism in accordance with the present invention.

Referring to FIG. 1, an exemplary gas turbine ducted fan engine, such as is typically mounted on an aircraft and generally indicated at 10, is shown having a core gas turbine engine having a stage of fan blades 12 at its upstream end. A cowl 22 is spaced from the core engine by struts 24 to define an annular duct 26, known as a bypass duct. A flow of air from the fan blades 12 is divided so that a proportion flows through the bypass duct 26 and a proportion passes through the core engine. The exemplary core engine operates in conventional manner so that the air is compressed by compressor section 14 before being mixed with fuel and the mixture combusted in a combustor 16. The hot combustion gases then expand through turbine section 18 which drives the compressor section 14 and the fan 12 before exhausting through an exhaust nozzle 20.

Figure 2:
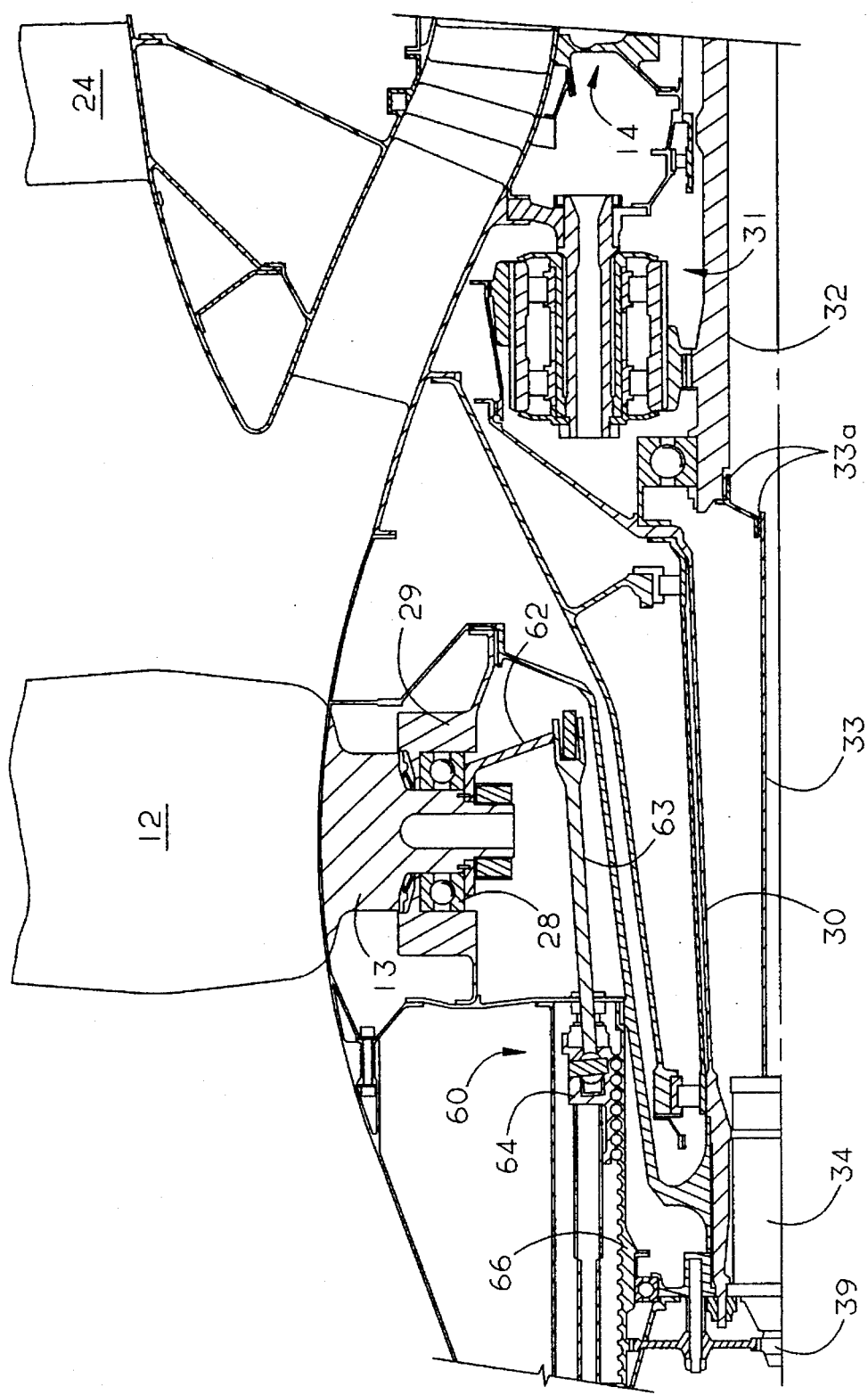
FIG. 2 is a partially sectioned view along the centre line c—c of part of the gas turbine engine shown in FIG. 1.

The fan blades 12 are rotated by a fan shaft 30, as seen in FIG. 2. The fan shaft 30 is driven by a power input or turbine shaft 32 through reduction gearing 31. Thus, the fan shaft 30 rotates at a different speed than the turbine shaft 32. Also, the fan shaft 30 preferably rotates in the opposite direction to the turbine shaft 32.

The root portions 13 of the fan blades 12 are mounted on ball bearings 28, within a support structure or element 29 formed about and connected to or integral with the fan shaft 30 and rotatable therewith, so that the fan blades 12 can rotate about their longitudinal axes to vary their pitch. By way of the present invention, the pitch of the fan blades 12 is adjusted during flight to achieve efficient operation of the engine 10.

Figure 3:
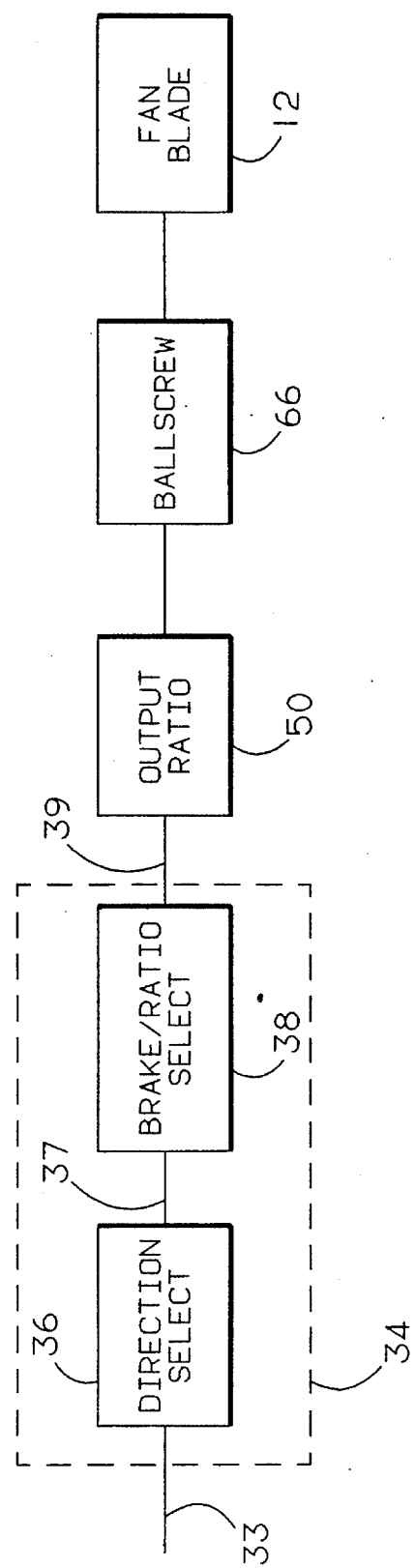
FIG. 3 is a block diagram of a pitch change mechanism in accordance with the present invention.

Referring to FIG. 3, the pitch change mechanism can include, for example, pitch adjustment means 60 to vary the pitch of the fan blades 12. A gear box 34 controls the pitch adjustment means 60 in response to pitch control signals. The pitch control signals are electrical signals generated automatically by a conventional electronic engine control system (not shown) in response to a given rotational speed and/or operating condition of the engine 10.

The gear box 34 has a direction select section 36 and a brake/ratio select section 38. The direction select section 36 allows the pitch of the fan blades 12 to be adjusted in either direction, by controlling the direction of rotational force or power provided to the adjustment means 60, and the brake/ratio section 38 allows the adjustment means 60 to be driven at pre-set rates by controlling the rotational speed of that rotational force or power.

The gear box 34 is mounted in the fan shaft 30, as seen in FIG. 2, and rotates therewith. An input shaft 33 to the gear box 34 is, for example, mechanically connected to the turbine shaft 32. The input shaft 33 is typically coupled by splined joints 33a to the turbine shaft 32 so that the input shaft 33 rotates with the turbine shaft 32. The difference between the speeds of the fan shaft 30 and the turbine shaft 32 is used to drive an output shaft 39 of the gear box 34. The rotary power of the output shaft 39 is converted to the desired output ratio by gears 50 which drive the pitch adjustment means 60.

Figure 4:
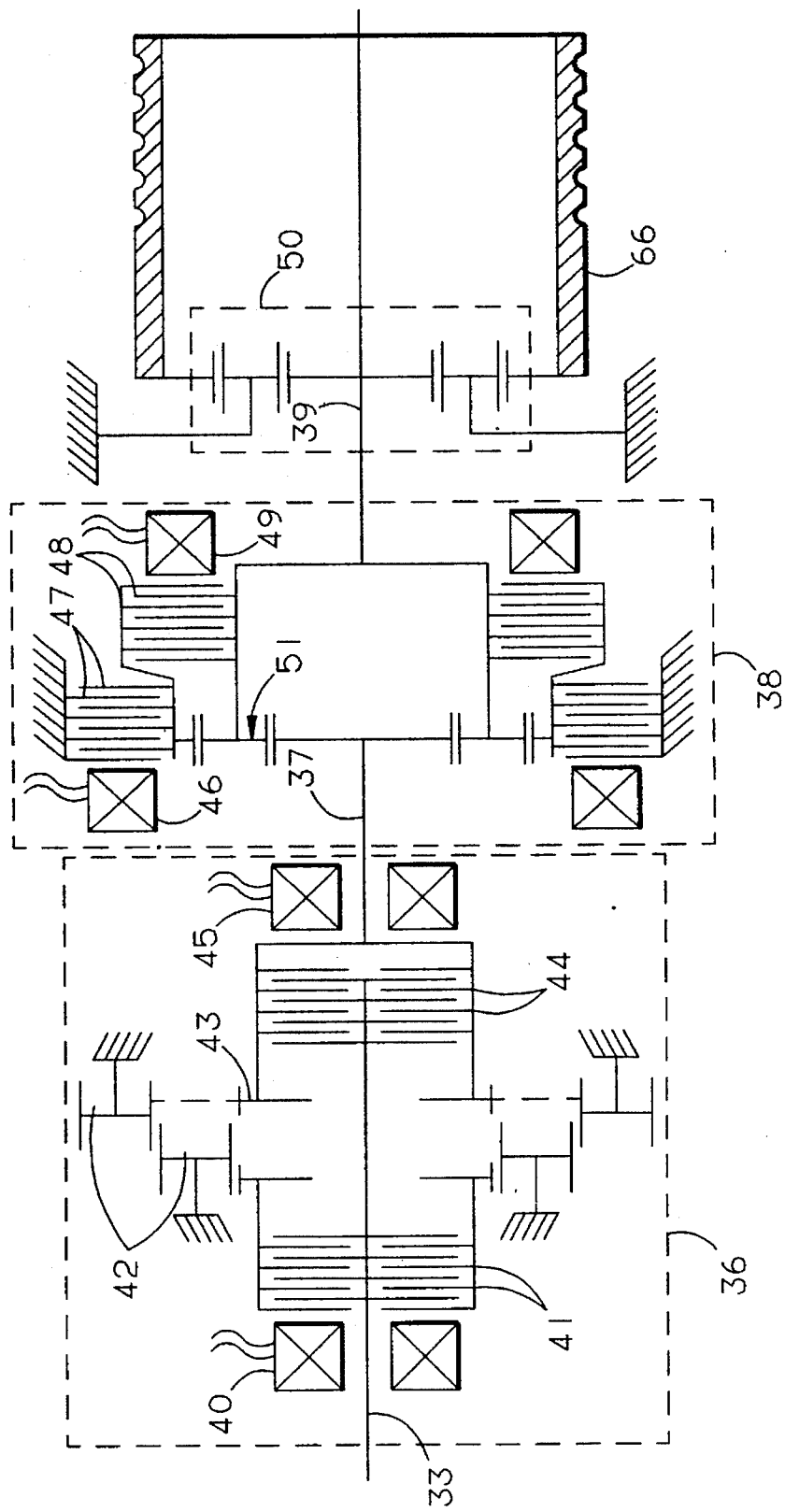
FIG. 4 is a schematic view of a pitch controller for use in a pitch change mechanism in accordance with the present invention.

When the pitch of the blades 12 is to be changed according to whatever desired operational characteristics are selected by the user, an electrical signal from the electronic engine control system is sent to the gear box 34. The electrical signal energizes one of the solenoids, 40 or 45, in the direction select section 36 of the gear box 34 and one of the solenoids, 46 or 49, in the brake/ratio select section 38 of the gear box 34 (FIG. 4).

When solenoid 40 is energized, clutch plates 41 engage to connect the input shaft 33 with idler gears 42 which are mounted via splined joints to the fan shaft 30. The idler gears 42 move to connect with a gear 43 and drive intermediate shaft 37 to rotate in the opposite direction to the input shaft 33.

Alternatively, if solenoid 45 is energized clutch plates 44 engage to drive intermediate shaft 37 to rotate in the same direction as the input shaft 33. According to the user's desired orientation, one of these directions of rotation of the intermediate shaft 37 can be designated as the "forward" direction of power and the other direction as the "reverse" direction of power. The intermediate shaft 37 drives the brake/ratio section 38 of the gear box 34.

In the embodiment shown, clutch plates 48 and 47 are normally engaged, locking the output shaft 39. When solenoid 49 is energized, clutch plates 48 disengage, brake 47 remains engaged, and speed of the output shaft 39 is reduced by a gear ratio of, for example 3.6:1, through exemplary planet gears 51 mounted within the ring gear connected to brake 47. Alternatively, when solenoid 46 is energized, brake 47 disengages, clutch plates 48 remain engaged and an exemplary gear ratio of 1:1 is selected. Thus, this mechanism permits the speed of the rotational power output to be selected from at least two different speeds. In this way, coarse and fine adjustments of the blade pitch can be achieved at variable rates.

The speed of the output shaft 39 is further reduced by the exemplary planet gears 50. The planet gears 50 are selected given the desired output ratio to drive the pitch adjustment means 60.

The pitch adjustment means 60 comprises, for example, a plurality of levers 62. One end of each of the levers 62 is attached to the root 13 of a blade 12. The other end of each of the levers 62 is attached to a rod 63 connected to a carriage 64 mounted on a ballscrew 66. The ballscrew 66 preferably has a recirculating ball thread which allows the carriage 64 to move along the ballscrew 66. The rotational power from the output shaft 39 of the gear box 34 rotates the ballscrew 66 so that the carriage 64 moves along the ballscrew 66. Translation of the carriage 64 along the ballscrew 66 causes the levers 62 to move and rotates the fan blades 12 about their longitudinal axes.

Once the fan blades 12 have reached the desired pitch position for a given engine speed and/or operating condition, the electronic control system switches off the solenoids 40, 45, 46 and 49. The clutch plates 41 and 44 disengage so that rotary power is not transmitted to the output shaft 39, thereby reducing wear on the apparatus. The clutch plates 48 and 47 are engaged to lock the output shaft 39 and maintain the pitch setting.

A pitch controller mechanism in accordance with the present invention uses the difference between the speeds of rotation of the fan shaft 30 and the turbine shaft 32 to drive the pitch adjustment means 60. By utilizing a gear box 34 between the two shafts 30 and 32 to drive the pitch adjustment means the mechanism is not dependent on a hydraulic system. The pitch of the blades 12 can therefore be changed when the engine 10 is not operational by rotating the stage of fan blades 12 by hand. This is particularly advantageous during maintenance when the pitch of the fan blades 12 needs to be changed to allow removal of the blades 12.

Although the present invention has been described in detail with reference to a particular gas turbine engine 10, that was by way of illustration and example only. It will be appreciated by one skilled in the art that it is applicable to any engine having two shafts rotating at different speeds, the blades of one of the shafts requiring pitch adjustment. Further, with respect to turbine engines, it is possible to utilize the present invention without connection to the turbine drive shaft by connection to another source of rotation having a speed difference with respect to a support structure for the gear and clutch structure of the present invention. Thus, the spirit and scope of the present invention are limited only by the terms of the claims below.

What is claimed is:

1. A gear and clutch drive arrangement for controlling the pitch of one or more blades, each of said blades being movably mounted to a rotatable support element, said support element being driven by a rotating drive shaft, the arrangement comprising:

first means connected to said drive shaft for receiving rotational force and controlling the direction of that force;

second means connected to said first means for modifying a magnitude of the received rotational force and then applying that modified force to a third means;

said third means, mounted to said support element, being actuatable to move said blades with respect to said support element in response to said modified force; and said first and second means each including selectively actuatable clutches connected to rotatable gears.

2. An apparatus comprising:

a support structure;

first and second drive shafts, each of which is rotatable with respect to said support structure;

a forward clutch means, selectively connectable to said first drive shaft, for providing forward rotational power to said second drive shaft;

a reverse clutch means, selectively connectable to said first drive shaft alternatively of the connection thereto by said forward clutch means, for providing reverse rotational power to said second drive shaft;

locking means, connectable to said support structure, for preventing rotation of said second drive shaft when neither said forward clutch means nor said reverse clutch means is connected to said first drive shaft; and gear means selectively connectable to said second drive shaft for controlling the rotational speed of said second drive shaft.

3. An apparatus for controlling the pitch of a plurality of blades mounted on a rotatable support element, each of said blades being rotatable with respect to said support element such that the blade pitch can be varied, said support element being mounted about a rotatable input drive shaft and being rotated by said input drive shaft at a rotational speed different from the rotational speed of said input drive shaft, said apparatus being driven by that difference in rotational speeds and comprising:

a first portion having a directional clutch and gear structure selectively connectable to said input drive shaft for determining the rotational direction that said apparatus is driven;

a second portion having a speed clutch and gear structure connected to said first portion for determining the rotational speed of said apparatus; and an output shaft connected to said second portion for supplying rotary power to be used for causing said blades to rotate with respect to said support element while said support element is rotating.

4. The apparatus according to claim 3 including means for preventing rotation of said output shaft when said first portion is not connected to said input drive shaft.

5. The apparatus according to claim 3 wherein said first portion includes a forward clutch and a reverse clutch, each of which is alternatively engagable with said input drive shaft and each of which is separately actuatable by a solenoid device, engagement of the forward clutch serving to cause rotation of said output shaft in a forward direction and engagement of the reverse clutch serving to cause rotation of said output shaft in the reverse direction.

6. The apparatus according to claim 5 wherein said reverse clutch causes reverse rotation via an idler gear structure connected to said support element.

7. The apparatus according to claim 3 wherein said second portion includes a planetary and ring gear arrangement having said ring gear selectively engagable with a brake means to alter said rotational speed.

8. The apparatus according to claim 7 wherein said first portion includes a forward clutch and a reverse clutch which are independently engagable with said input drive shaft, and when neither said forward nor said reverse clutch are so engaged said output shaft receives no rotational power from said input shaft.

9. An aircraft comprising:

a gas turbine engine having a drive shaft which rotates during engine operation;

a fan shaft connected to and driven by said drive shaft through reduction gearing;

a plurality of fan blades connected to said fan shaft for rotation with said fan shaft, said blades being movable with respect to said fan shaft such that the pitch of said blades with respect to said fan shaft can be changed;

an actuation mechanism connected to said blades for changing the pitch of said blades while said fan shaft is being rotated;

gear drive means connectable to said drive shaft for providing rotational power to said actuation mechanism;

clutch means for selectively connecting said gear drive means to said drive shaft such that said rotational power is provided to said actuation mechanism in either a forward or reverse direction or, alternatively, such that no rotational power is provided to said actuation mechanism and said actuation mechanism restricts changes in blade pitch; and said clutch means means including a first portion having a first and a second clutch member, each of which is alternatively actuatable by a solenoid, and one of which is connected to an idler gear structure for reversing the direction of said rotational power supplied to said actuation mechanism, said solenoids controlling said first and second clutch members such that the absence of power to said solenoids results in disengage.

10. A control apparatus for adjusting the pitch of rotating blades, wherein said blades are attached to a rotating support driven by an input drive shaft rotating at a different speed than said support, the control apparatus being driven by that differential speed and comprising:

a first portion having a forward clutch and a reverse clutch selectively connectable to said input drive shaft and actuation means for separately controlling that connection;

an intermediate drive means connected to either said forward clutch or said reverse clutch for receiving rotational power in either a forward or reverse rotational direction, said intermediate drive means being isolated from said input drive shaft when not connected to either said forward or said reverse clutch so as not to receive rotational power therefrom;

an output drive means; and a second portion connected between said intermediate drive means and said output drive means having a clutch and gear arrangement for selectively controlling the speed of rotational power provided by said output drive means.

* * * * *